(12) United States Patent
Boyd

(10) Patent No.: US 7,710,263 B2
(45) Date of Patent: May 4, 2010

(54) ESCAPE NOTIFICATION SYSTEM

(75) Inventor: Randal D. Boyd, Knoxville, TN (US)

(73) Assignee: Radio Systems Corporation, Knoxville, TN (US)

( * ) Notice: Subject to any disclaimer, the term of this patent is extended or adjusted under 35 U.S.C. 154(b) by 341 days.

(21) Appl. No.: 11/743,696

(22) Filed: May 3, 2007

(65) Prior Publication Data

US 2008/0272908 A1    Nov. 6, 2008

(51) Int. Cl.
    *G08B 23/00*    (2006.01)
(52) U.S. Cl. .............. 340/539.13; 340/573.3; 340/573.1; 119/721; 119/908
(58) Field of Classification Search .......... None
    See application file for complete search history.

(56) References Cited

U.S. PATENT DOCUMENTS

| | | | |
|---|---|---|---|
| 5,454,350 A | 10/1995 | Betheil | |
| 5,603,287 A * | 2/1997 | Houck | 119/719 |
| 5,752,335 A | 5/1998 | Shimogori et al. | |
| 5,877,742 A | 3/1999 | Klink | |
| 5,955,953 A | 9/1999 | Hanson et al. | |
| 6,003,473 A | 12/1999 | Printz | |
| 6,067,018 A * | 5/2000 | Skelton et al. | 340/573.3 |
| 6,283,065 B1 | 9/2001 | Shorrock et al. | |
| 6,502,060 B1 | 12/2002 | Christian | |
| 6,568,354 B1 | 5/2003 | Wasserman et al. | |
| 6,721,681 B1 | 4/2004 | Christian et al. | |
| 2002/0135487 A1 | 9/2002 | Bowling | |
| 2002/0196151 A1 * | 12/2002 | Troxler | 340/573.4 |
| 2003/0118979 A1 | 6/2003 | Axelrod | |
| 2003/0229452 A1 | 12/2003 | Lewis et al. | |
| 2005/0136946 A1 | 6/2005 | Trossen et al. | |
| 2005/0242137 A1 | 11/2005 | Fishman et al. | |
| 2005/0288007 A1 | 12/2005 | Benco et al. | |
| 2006/0011144 A1 | 1/2006 | Kates | |
| 2006/0011145 A1 | 1/2006 | Kates | |
| 2006/0011146 A1 | 1/2006 | Kates | |
| 2007/0032250 A1 | 2/2007 | Feher | |

* cited by examiner

*Primary Examiner*—Daniel Wu
*Assistant Examiner*—Nay Tun
(74) *Attorney, Agent, or Firm*—Pitts & Brittian, P.C.

(57) ABSTRACT

A pet escape notification system for notifying a pet owner when a pet has escaped from a predefined boundary. The escape notification system is used in association with an electronic animal containment system for maintaining a pet within the predefined boundary. A pet unit transmitter is provided for delivering a proximity alert signal to a base unit when the pet unit receives a transmitting antenna signal. After receiving the proximity alert signal, the base unit begins sending a location inquiry signal to the pet unit. Upon receipt of the location inquiry signal, the pet unit broadcasts a location inquiry response signal. If the location inquiry response signal is received by the base unit receiver, the base unit processing unit determines that the pet is still within or close to the boundary. Otherwise the base unit controller activates a communication network to notify the pet owner that the pet has escaped.

15 Claims, 5 Drawing Sheets

ESCAPE NOTIFICATION SYSTEM

CROSS-REFERENCE TO RELATED APPLICATIONS

Not applicable

STATEMENT REGARDING FEDERALLY-SPONSORED RESEARCH OR DEVELOPMENT

Not applicable

BACKGROUND OF THE INVENTION

1. Field of Invention

The invention relates to a presence monitoring system. More particularly, this invention relates to an electronic escape notification system used alone or in association with an animal containment system.

2. Description of the Related Art

In the field of animal husbandry, it has long been a concern for containing animals within a given boundary, and for identifying when an animal has left such boundary. This is true whether the animals are pets confined within a given bounded area or the animals are livestock. Animals have typically been confined in fenced enclosures, with various types of fences. Above-ground fences have been adapted to include behavioral modification devices such as electrically charged wires, barbed-wire, or otherwise adapted to deter an animal from crossing.

More recently, electronic animal containment systems have been used as an alternative to conventional fencing to keep animals from straying. In these systems, a loop antenna is buried along the perimeter of the area in which the animal is to be contained. The animal is fitted with a device for generating a corrective signal in one of various conventional forms, the device and the antenna working cooperatively such that when the animal approaches the boundary, a warning and/or a corrective signal is sent to the animal.

A global positioning systems (GPS) has also been used to define the boundaries of a selected area. In such a system, the position of the animal(s) to be confined is constantly monitored to determine if and when the animal crosses a boundary. For example, in U.S. Pat. No. 6,271,757 issued to Touchton et al., an electronic containment system using positional satellites is disclosed. The Touchton et al., system is provided for controlling the movement of animals relative to a selected confinement area. A portable programming transceiver is used to program the boundary of a selected confinement area as the device is moved along such boundary. A programmable collar transceiver worn by the animal provides GPS signals from the satellite to a remotely located control station. The control station tracks the movement of the animal relative to the boundary. If the animal crosses the boundary, the station transmits a stimulus activation signal to the collar so that a corrective stimulus may be produced for the animal. Tracking and containment of objects are accomplished by providing GPS-defined, user-programmable containment areas.

To this extent, animals have the potential to escape from any fencing system, e.g., digging underneath a conventional fence or ignoring the correction of the electronic animal containment system. If an animal leaves the containment area, there is typically not a mechanism whereby the animal may casually reenter a containment area bounded by conventional fencing or avoid a deterrent stimulus when attempting to reenter a containment area bounded by an electronic animal containment system. Both the physical barrier resulting from conventional fencing and the virtual barrier created by the corrective stimuli of an electronic animal containment system serve to discourage the escaped animal from returning to the containment area.

In the event that an animal escapes from a bounded area, it is important that the owner or caregiver be able to quickly discern such escape. This is both for the safety of the animal as well as that of property, persons, and other animals outside the bounded area. Typically, the animal owners or caregivers rely on identification worn on the animal and the assistance of others who find the animal. Typical of the art are those devices disclosed in the following U.S. Patents and Patent Application Publications:

| U.S. Pat. No./application Ser. No. | Inventor(s) | Issue Date |
| --- | --- | --- |
| 5,454,350 | S. M. Betheil | Oct. 3, 1995 |
| 5,752,335 | K. Shimogori et al. | May 19, 1998 |
| 5,877,742 | J. Klink | Mar. 2, 1999 |
| 5,955,953 | M. C. Hanson et al. | Sep. 21, 1999 |
| 6,003,473 | R. L. Printz | Dec. 21, 1999 |
| 6,067,018 | J. M. Skelton et al. | May 23, 2000 |
| 6,283,065 | J. E. Shorrock et al. | Sep. 4, 2001 |
| 6,502,060 | L. M. Christian | Dec. 31, 2002 |
| 6,568,354 | D. J. Wasserman et al. | May 27, 2003 |
| 6,721,681 | L. M. Christian et al. | Apr. 13, 2004 |
| 2002/0135487 | M. Bowling | Sep. 26, 2002 |
| 2003/0118979 | G. S. Axelrod | Jun. 26, 2003 |
| 2003/0229452 | B. S. Lewis et al. | Dec. 11, 2003 |
| 2005/0242137 | M. T. Fishman et al. | Nov. 3, 2005 |
| 2006/0011144 | L. Kates | Jan. 19, 2006 |
| 2006/0011145 | L. Kates | Jan. 19, 2006 |
| 2006/0011146 | L. Kates | Jan. 19, 2006 |

Of these patents, the '350 patent issued to Betheil discloses an electronic dialing attachment is adapted to be secured to a pet collar or other band member worn by a pet. The attachment includes a holder body having a channel for receiving a programmable dialing element. The dialing element is programmable to store a telephone dialing sequence corresponding to the telephone number of the owner of the pet and is detachably coupled to the holder body. If the pet is lost, the dialing element is adapted to be detached from the holder body and positioned near the handset of a telephone by the finder of the lost pet.

Shimogori et al., in the '335 patent, disclose a "talking" pet tag for association with a pet wherein a prerecorded message is easily retrievable by the finder of a lost pet by simply depressing a play button.

The '742 device disclosed by Klink is a medical identification bracelet which has electronic circuitry to display detailed, patient medical information. The bracelet is formatted using a programming station into which is entered up to 16 kilobits of medical and personal information about an individual. The programming station transfers the formatted information to the bracelet via an infrared interface device. The medical identification bracelet has an LCD view screen which displays, in a scrolling fashion, data when a button is pushed. All information is available at the display.

In the '953 patent issued to Hanson et al., an article to be worn with an identification unit mounted thereon is disclosed. The identification unit includes a speaker for transmitting audio signals. Further included is a message playback switch for transmitting a playback signal and a message record switch for transmitting a record signal. The identification unit further includes a sound module adapted to store an audio message including a name of the pet and at least one of an address and a phone number upon the receipt of the record signal. The sound module further serves to playback the audio message upon the receipt of the playback signal.

In his '473 patent, Printz discloses a pet identification and retrieval device for providing information regarding a lost pet to an individual who finds the pet. The '473 device includes a front half enclosure and rear half enclosure. The front half enclosure contains a play switch, a speaker opening and a low battery indicator. The rear half enclosure contains a recessed recording switch, a permanent identification plate, and a fastening means. The device is connected to a pet's collar via a swivel link or is held stationary against the collar by other fastening means. A message is recorded using solid state digital recording and playback technology, which permits a 30-second message to be recorded.

The '018 patent issued to Skelton et al., discloses a lost pet notification system which includes three elements: a pet collar for automatically activating an alarm once the pet becomes lost; a portable hand held unit for continually monitoring the location of the pet; and a base station for automatically transmitting a signal to the owner once the portable unit determines that the pet is lost. The pet collar continually receives a polling signal from the portable unit while the pet is within transmission range of the portable unit. In response to each polling signal, the pet collar transmits a reply signal to the portable unit. Once the polling signal can no longer be detected by the pet collar, the pet collar automatically activates an alarm. In addition, the portable unit activates an alarm and also transmits a notification signal to the base station. Once the notification signal is received, a the base station automatically places a telephone call to the predetermined telephone number and plays the associated message to alert the pet owner that the pet is lost. If the pet comes back within the transmission range of the portable unit, the portable unit transmits a second notification signal to the base unit which places a second call to the owner to notify him or her that their pet is safe. Skelton et al., further disclose that the '018 device may also include features such as a paging unit for receiving information, a global positioning device, a RF beacon transmitter, and cellular telephone emulator to transmit information to a monitoring station.

Shorrock et al., in their '065 patent, disclose a collar stud attachable to an animal collar to function as a tag, collar lock, and/or electronic identification device. The stud includes a cap positionable adjacent an exterior of the collar and a base that is positionable adjacent an interior surface of the collar. A linkage interconnects the cap and base in a spaced apart fashion to allow a portion of the collar to be sandwiched between the interconnected cap and base. At least a portion of the linkage extends through an aperture of the collar portion and helps secure the stud to the collar portion. In one embodiment, a transponder is incorporated into the stud, the transponder including a memory for storing an identification code. The code can be used to access a corresponding data record in a database.

The '060 patent issued to Christian discloses a chronometer for monitoring the age of a dog. The chronometer is further provided with identification information regarding the dog. The '060 device is attachable to a dog collar. Additional data, displays, and information may be carried, manipulated, entered and chosen by the use of user control buttons or the like.

Wasserman et al., in their '354 patent, disclose a pet identification tag with an electronic display for displaying pet owner identification information when activated. Pertinent information for the pet can be displayed. The pet identification tag is mountable on a dog or cat collar.

The '681 patent issued to Christian et al., discloses a chronometric identification and location tag for an animal, such as a dog, that incorporates a variety of detection and sensing functions as well as communication capacities. Assembled in a compact form that allows ready transport on a trainable animal, such as a dog, the chronometer identification and location tag enables the location of the associated animal, as well as the transmission and reception of information and data. Specific embodiments include the use of GPS to provide location data, as well as an alternative location system using temporary or permanent antenna installations. Hazardous material, visual, and acoustic detectors and other sensors and/or generators may be used in conjunction with transmission facilities for providing data regarding the animal's environment. Information and signals may be transmitted to the central controller by a receiver and a speaker can provide for audio signaling to the animal or others close to the animal in an audible range of the speaker.

Similar to the Printz device discussed above, the Bowling device disclosed in the '487 application is directed toward a portable, self-contained identification system including a base and a removable lid operatively and sealingly engageable with the base. The removable lid and the base cooperate to form a sealed enclosure when the removable lid is engaged with the base. A recording device includes a record microphone and a record switch and the playback device includes a speaker and a playback switch. The recording switch is manually actuated to record the message and a playback switch is actuated by the depression and the release of the playback button, such that the playback switch is automatically actuated by removal of the removable lid to playback the message.

Axelrod, in the '979 application, discloses a method and apparatus for providing textual, audio and/or video information regarding a pet to a user comprising supplying an electronic database which database has stored textual, audio and/or video information data files representative of the pet's behavior, identification, characteristics and the like. Although not illustrated, Axelrod teaches the use of a portable electronic device having a video display, an audio output, input controls and a database. Axelrod refers to the '979 device as electronic book specifically for educational purposes related to selecting, training and caring for animals.

Lewis et al., in their '452 application, disclose various systems and methods for integrating, managing and using electronic and tangible data relating to animals, especially data corresponding to official documentation. A secure, centralized repository for storing animal characteristic information, owner information, health information, official status information and the like is provided that may be used by a multiplicity of different user classes. Tangible counterparts of the electronic data also are provided, including documentation as well as fixtures that may be attached to an animal. A unique animal identification code is stored in the database and preferably appears on the tangible counterparts. The code serves as a primary key with respect to an animal's electronic records and allows records to be easily associated with a particular animal.

In their '137 application, Fishman et al., disclose an information case for protectively storing information related to an individual. The case includes a base having a cavity defined therein. The cavity is configured to store and protect an information-bearing medium on which the information related to the individual can be disposed. As disclosed by Fishman et al., the information is written or printed on the selected medium.

Kates, in his '144, '145 and '146 applications, discloses a computer-aided training and management system that uses a computer or other processor in wireless communication with an instrumented dog collar and/or optionally, one or more dog interaction devices. In one embodiment, the instrumented dog collar is in two-way communication with a central computer system.

BRIEF SUMMARY OF THE INVENTION

An electronic animal containment system having an escape notification feature is provided. The electronic animal containment system, in general, is provided for maintaining a pet within a predefined area. The escape notification system communicates with the electronic animal containment system to detect when the pet has escaped from the predefined area.

The escape notification system includes an electronic animal containment system including a wire loop transmitting antenna bounding a containment area. A base unit is connected to the transmitting antenna for generating a signal carried by the transmitting antenna. A pet unit is worn by the pet and includes a receiver responsive to the signal for issuing warnings and/or corrections when the animal approaches the transmitting antenna boundary. The containment system is adapted to provide feedback regarding the presence of an animal within its boundary.

The operation of the containment system is similar to those conventional in the art. As the monitored pet approaches a warning zone proximate to the transmitting antenna, the receiver detects the signal transmitted by the antenna, and generates a warning stimulus. Should the monitored pet move closer to the transmitting antenna and into correction area, the increase in signal strength causes the receiver to generate a corrective stimulus accompanied by the warning stimulus.

The pet unit further includes a processing unit provided for determining when a signal is received from the transmitting antenna, thereby indicating that the pet has approached the boundary. A pet unit transmitter is provided for delivering a proximity alert signal to the base unit when the pet unit receives the transmitting antenna signal. The base unit includes a receiver for receiving the proximity alert signal. After receiving the proximity alert signal, the base unit begins sending a location inquiry signal to the pet unit, which is received by the pet unit receiver. Upon receipt of the location inquiry signal, the pet unit processing unit generates a location inquiry response signal which is broadcast by the pet unit transmitter. If the location inquiry response signal is received by the base unit receiver, the base unit processing unit determines that the pet is still within or close to the boundary. This process is repeated for a selected duration, after which the location inquiry signal is ceased.

If the location inquiry signal is not received by the pet unit receiver, and/or the location inquiry response signal is either not sent by the pet unit transmitter or received by the base unit receiver, then the base unit processing unit determines that the pet has escaped. Upon such determination, the base unit initiates a notification circuit provided for notifying the owner or caretaker of the pet of such escape. In one embodiment, the location inquiry signal will continue to be broadcast after determination that the pet has escaped, such that if the pet returns, the owner or caretaker is notified of such return.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

An electronic animal containment system having an escape notification feature, or escape notification system, is identified as 10 herein and in the accompanying figures. The electronic animal containment system, in general, is provided for maintaining a pet within a predefined area. The escape notification system communicates with the electronic animal containment system to detect when the pet has escaped from the predefined area.

Figure 1:
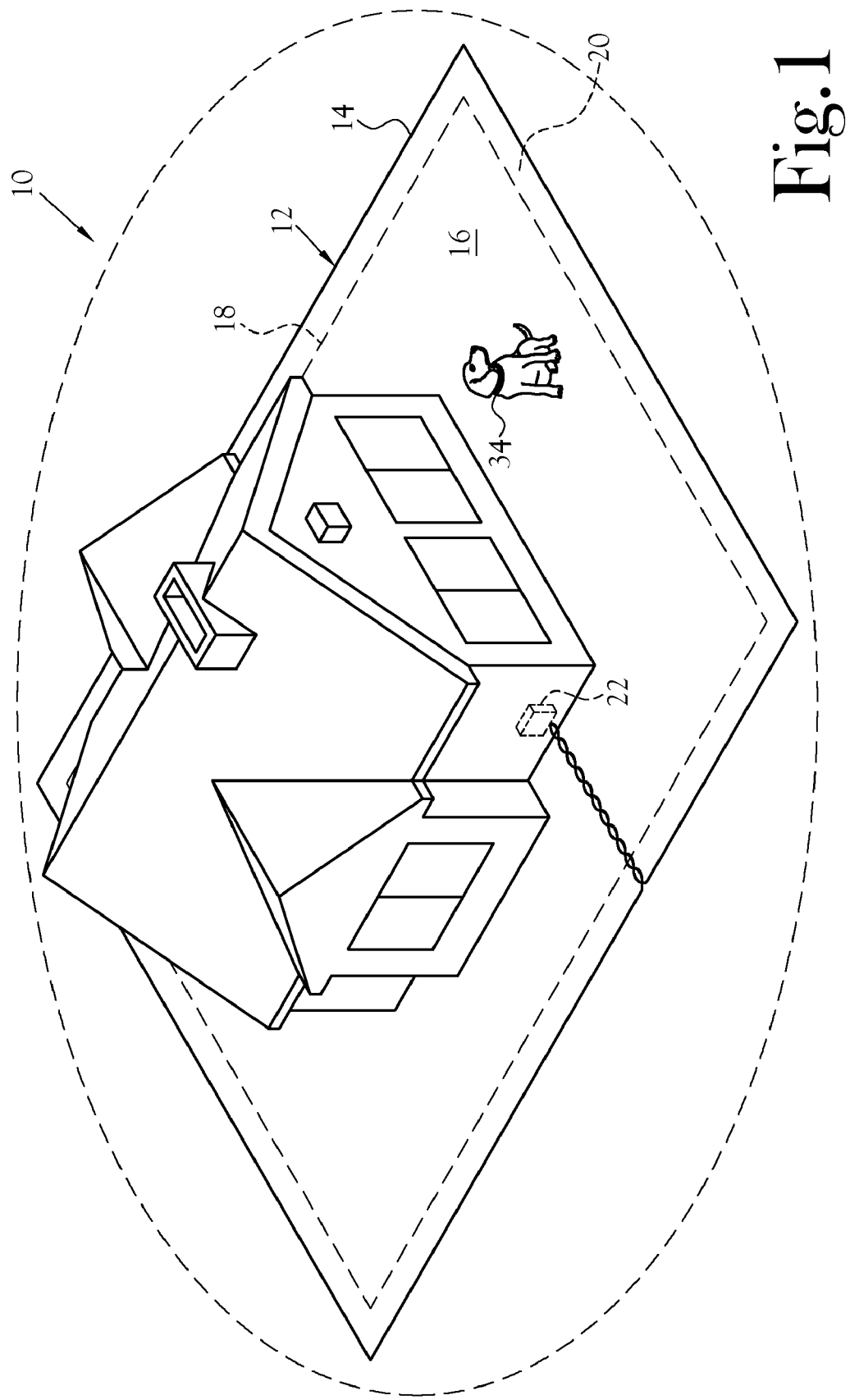
FIG. 1 is a perspective illustration of one embodiment of an escape notification system constructed in accordance with several features of the present invention.

As illustrated in FIG. 1, the escape notification system 10, includes an electronic animal containment system 12 including a wire loop transmitting antenna 14 bounding a containment area 16. The transmitting antenna 14 has a range through which its signal is broadcast, with the range being dependent upon several factors including depth of burial, power delivered to the transmitting antenna 14, and other variables known and understood by those skilled in the art. At the extent of the range of the transmitting antenna 14 is defined a warning zone boundary 18, at which point the transmitting antenna 14 signal is detectable. While the range extends on either side of the transmitting antenna 14, for purposes of animal containment, the warning zone boundary 18 on the interior of the containment area 16 is of primary concern. At least a portion of the area between the warning zone boundary 18 and the transmitting antenna 14 defines a warning zone 20. A base unit 22 is connected to the transmitting antenna 14 for generating a signal carried by the transmitting antenna 14. A pet unit 34 is worn by the pet and is responsive to the signal for issuing warnings and/or corrections when the animal approaches the transmitting antenna 14. Electronic animal containment systems are commonly used to keep an animal within a prescribed boundary. In the present invention, the system 12 is adapted to provide feedback regarding the presence of an animal within its boundary.

The operation of the system 12 for containment of the pet is similar to those conventional in the art. As the monitored pet approaches a warning zone 20 proximate to the transmitting antenna 14, the receiver 28 detects the signal transmitted by the antenna 14, and generates a warning stimulus. Should the monitored pet move closer to the transmitting antenna 14, the signal strength eventually meets the condition for the pet unit 34 to generate a corrective stimulus. In one embodiment, the corrective stimulus is also accompanied by the warning stimulus. For convenience, the signal transmitted by the antenna 14 may be referred to as a containment signal that may trigger either or both of the warning stimulus and the corrective stimulus. One skilled in the art will recognize that various mechanisms for achieving multiple levels of correction may be used, such as signal threshold monitoring or multiple transmitting antennas carrying differing signals. Further, it will be understood that various types of corrective stimuli may be selectively employed as required by the particular pet and environment in which the system is employed.

The pet unit 34 includes a receiver 38 tuned to the signal from the base unit 22, a processing unit 36 provided for determining when a signal is received from the transmitting antenna 14, thereby indicating that the pet has approached the warning zone boundary 18. A pet unit transmitter 40 is provided for delivering a proximity alert signal to the base unit 22 when the pet unit 34 receives the transmitting antenna signal. To this extent, the base unit 22 further includes a receiver 28 in communication with the controller 24 for receiving the proximity alert signal. After receiving the proximity alert signal, the base unit controller 24 communicates with a location inquiry signal generator 30 to generate a location inquiry signal to be broadcast by the base unit transmitter 26 in an attempt to reach the pet unit 34, and to be received by the pet unit receiver 38. Upon receipt of the location inquiry signal, the pet unit processing unit 36 communicates with a location inquiry signal generator 44 to generate a location inquiry response signal which is broadcast by the pet unit transmitter 40. If the location inquiry response signal is received by the base unit receiver 28, the base unit controller 24 determines that the pet is still within or close to the containment area 16. This process is repeated for a selected duration, after which the location inquiry signal is ceased.

If the location inquiry signal is not received by the pet unit receiver 38, and/or the location inquiry response signal is either not sent by the pet unit transmitter 40 or received by the base unit receiver 28, then the base unit controller 24 determines that the pet has escaped. Upon such determination, the base unit 22 initiates a notification circuit provided for notifying the owner or caretaker of the pet of such escape. In one embodiment, the location inquiry signal will continue to be broadcast after determination that the pet has escaped, such that if the pet returns, the owner or caretaker is notified of such return.

Figure 2:
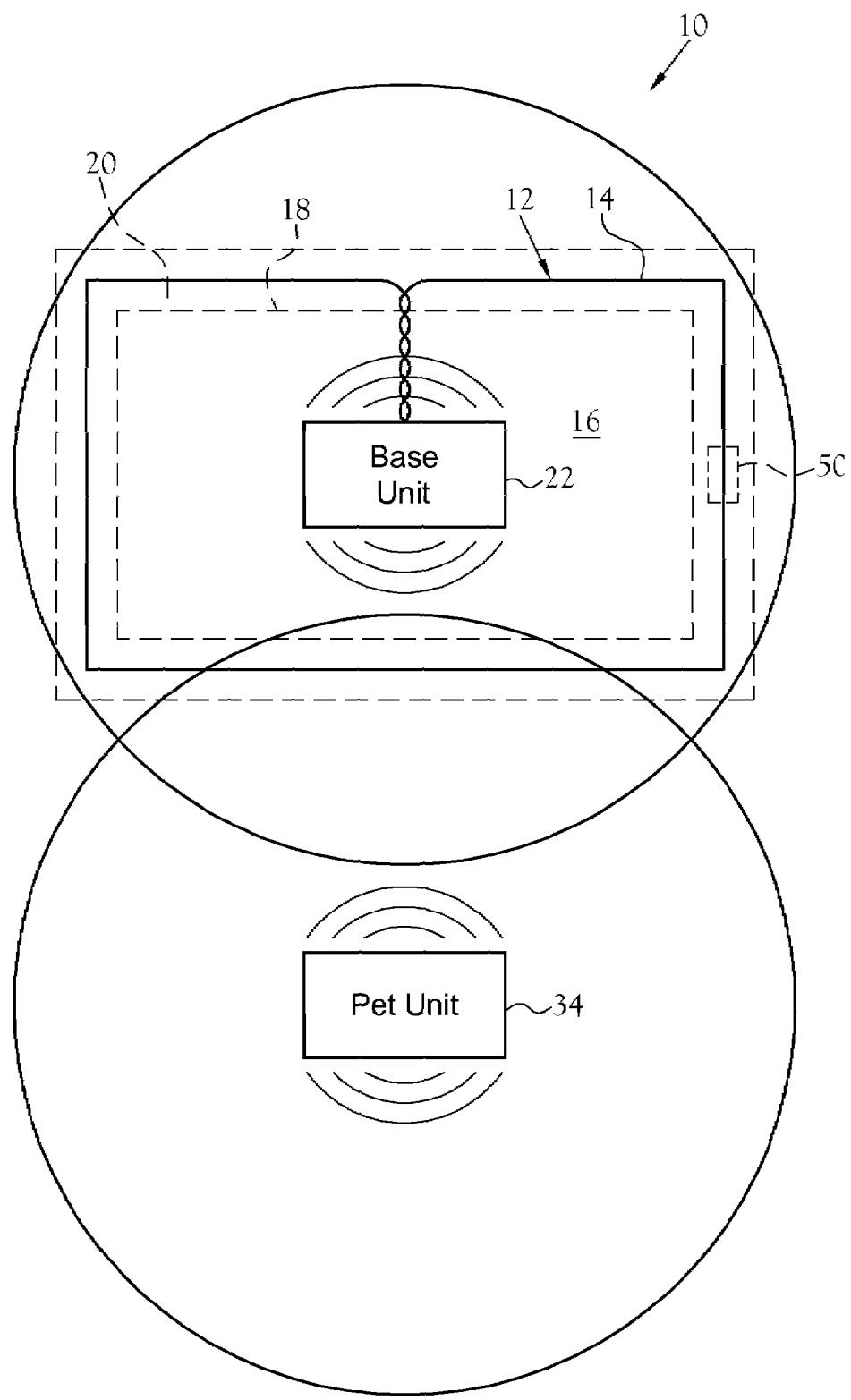
FIG. 2 is a schematic illustration of the relative positions of a base unit and a pet unit used in association with the present invention, wherein the pet unit has been moved out of the broadcast range of the base unit, indicating that a pet has escaped.
Figure 3:
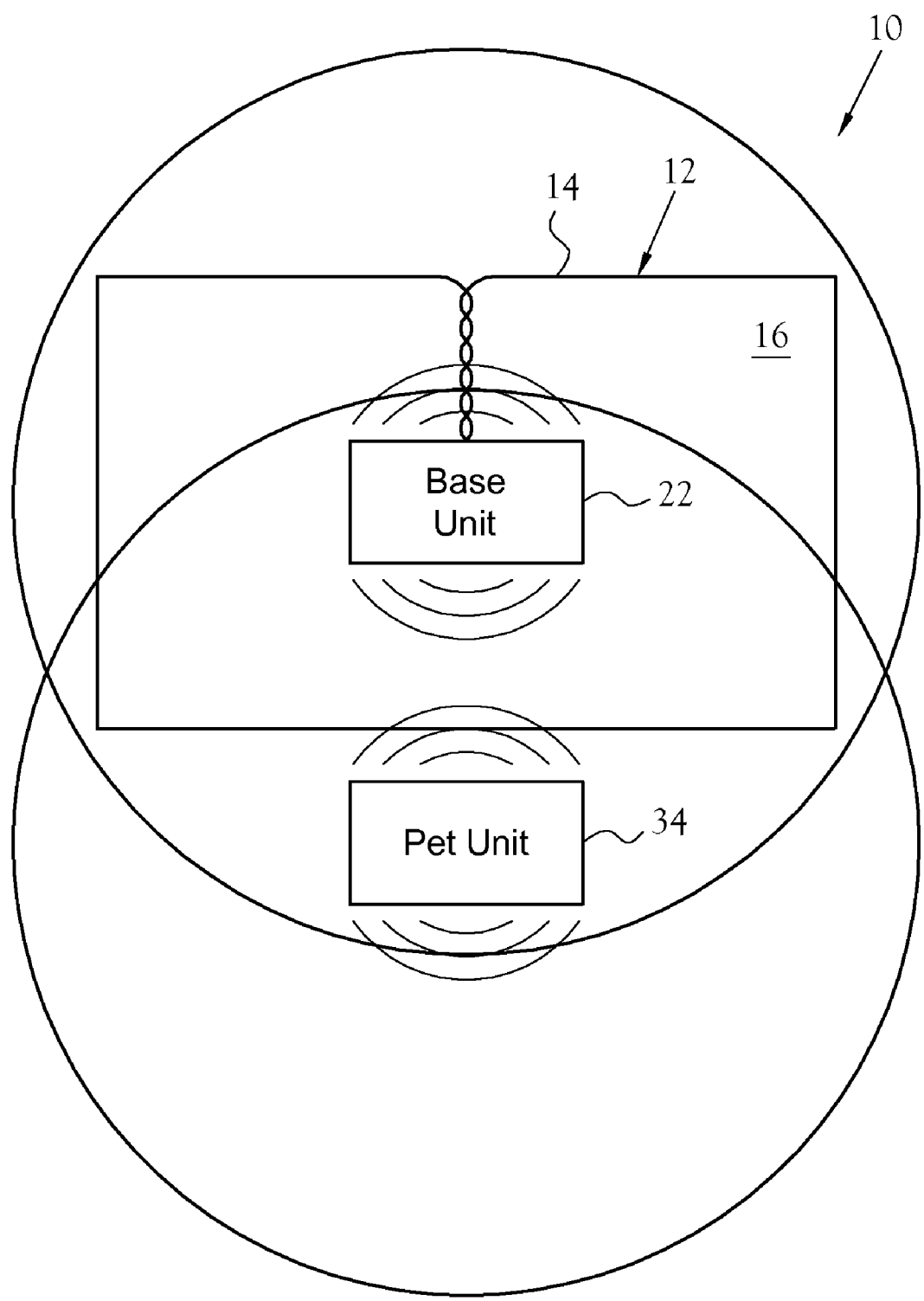
FIG. 3 is a schematic illustration of the relative positions of a base unit and a pet unit used in association with the present invention, wherein the pet unit has been moved out of a containment boundary, but within the broadcast range of the base unit.
Figure 4:
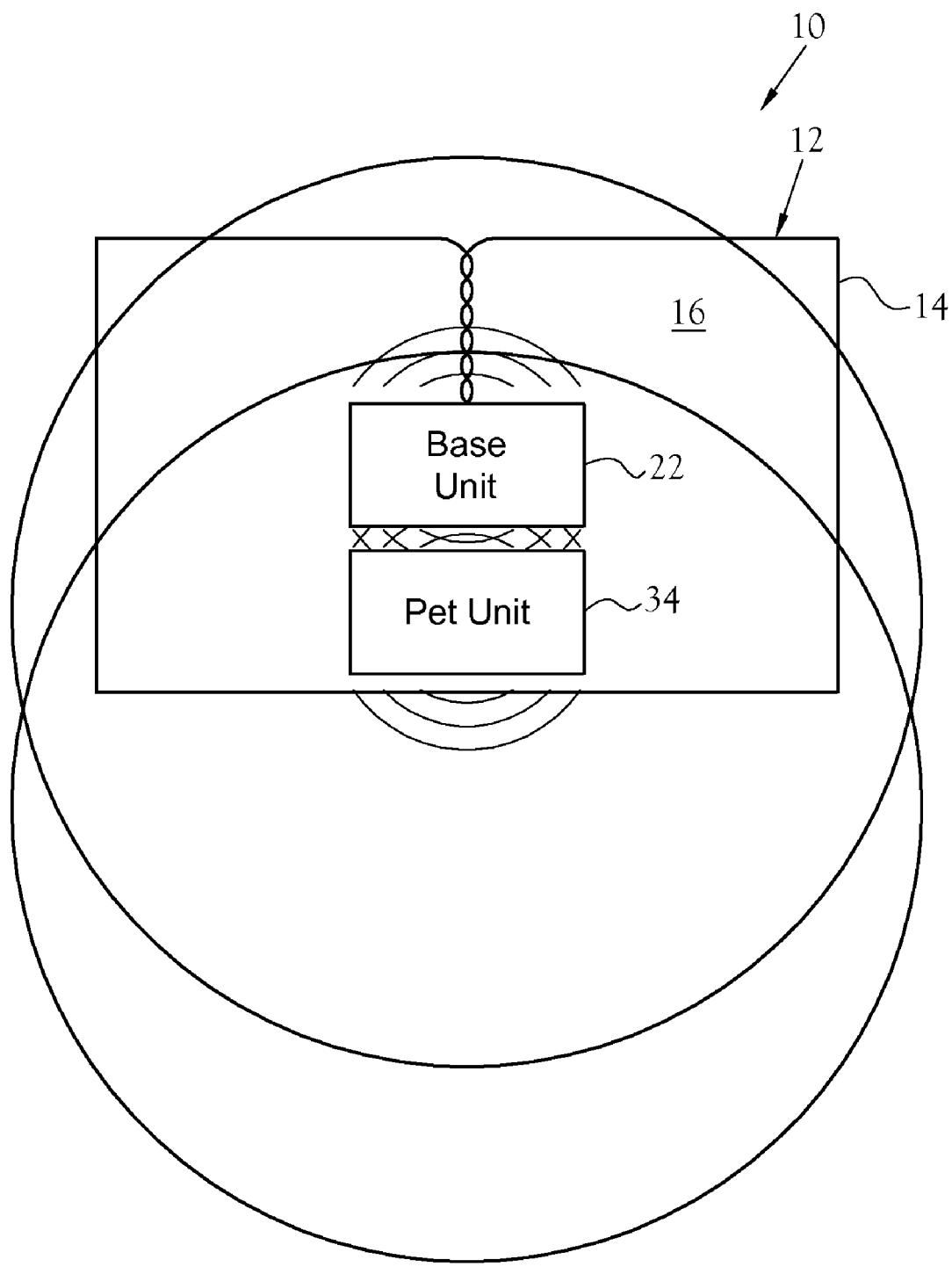
FIG. 4 is a schematic illustration of the relative positions of a base unit and a pet unit used in association with the present invention, wherein the pet unit remains within the containment boundary and thus the broadcast range of the base unit as well, indicating that a pet has remained within the bounded area.

FIGS. 2-4 illustrate various situations of the relative positions of the base unit 22 and the pet unit 34. In FIG. 2, the pet wearing the pet unit 34 has escaped from within the broadcast range of the base unit 22. In this situation, the base unit controller 24 determines that the pet has escaped and will continue to broadcast the location inquiry signal until a location inquiry response signal is received, indicating that the pet has returned. In this figure, also illustrated is the warning zone boundary 18 proximately indicating a warning zone 20 on either side of the transmitting antenna 14. When the warning zone boundary 18 is crossed, the pet unit transmitter 40 transmits the proximity alert signal in order to initiate the location inquiry signals.

Also illustrated in FIG. 2, in phantom, is a sensor 50 incorporated in an alternate embodiment of the present invention. Such sensor 50 is provided for determining when a pet has crossed the transmitting antenna 14 in order to initiate the transmission of the location inquiry signal. The sensor 50 may be any of a variety of sensors 50, including but not limited to piezoelectric cables and the like.

In FIG. 3, the pet wearing the pet unit 34 has escaped from the containment area 16, but remains within the range of the base unit transmitter 26. Further, the base unit receiver 28 is within the range of the pet unit transmitter 40. Accordingly, even though the pet has escaped, it has not gone so far as to create an alarm to the pet owner. In this instance, the pet may reenter the containment area 16 with no further incident. However, if the pet is escaping, it will typically continue until the situation in FIG. 2 has been established.

In FIG. 4, the pet has not escaped from the containment area 16, and is therefore in the range of the base unit transmitter 26. Likewise, the base unit receiver 28 is within range of the pet unit transmitter 40. Accordingly, no location inquiry is sent until the pet crosses the warning zone boundary 18 (see FIG. 2).

Figure 5:
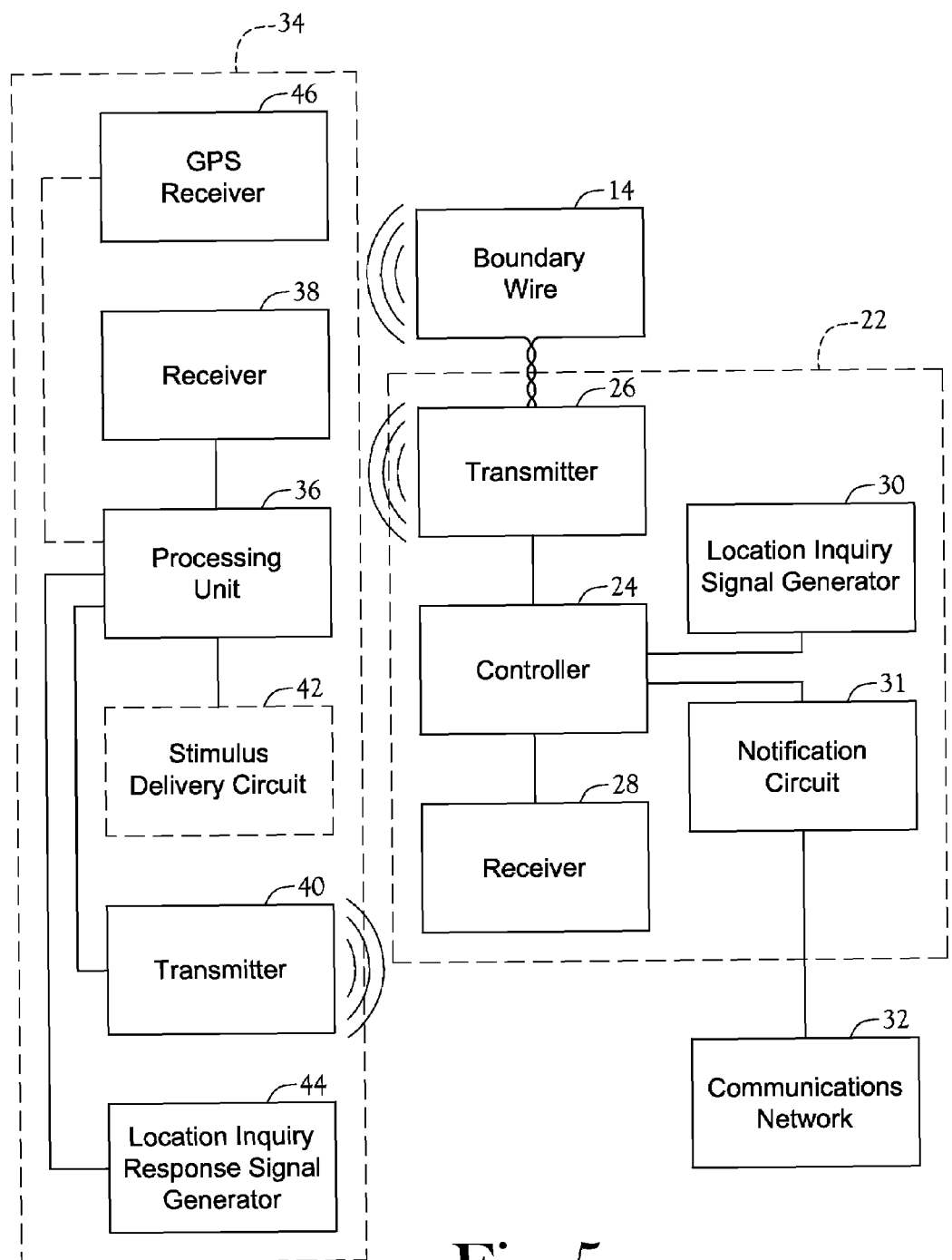
FIG. 5 is a block diagram of the major functions of the escape notification system of FIG. 1.

FIG. 5 illustrates a block diagram of the escape notification system 10. The system 10 includes primarily a base unit 22 electrically connected to a transmitting antenna 14, and a pet unit 34 worn by a pet. The base unit 22 includes a controller 24 for controlling the operations of the transmitter 26 and the receiver 28. The transmitter 26 delivers a signal to the boundary wire, or transmitting antenna 14, for defining a containment area 16. The controller 24 is in communication with a location inquiry signal generator 30 for generating the location inquiry signal to be broadcast by the base unit transmitter 26. The receiver 28 is provided for receiving the location inquiry response signal as described above. Upon determination that the pet has escaped, the controller 24 activates a notification circuit 31 to access a communications network 32 and notify the pet owner that the pet has escaped. The communications network 32 is any conventional communications network including but not limited to a landline network, a cellular telephone network, the internet, or any other communications network. The communications network 32 may also be in communication with a global positioning system (GPS), with a GPS receiver 46 incorporated in the pet unit 34 worn by the pet, in order to initiate tracking of the pet once it has been determined that the pet has escaped.

In one embodiment, an escape notification device is in communication with the communications network. The escape notification device can be located proximately or remotely with respect to the base unit 22 without departing from the scope or spirit of the present invention. The escape notification device indicates the location of the pet unit 34 with respect to the transmitter 26 to the user of the escape notification system 10. For example, the escape notification device generates a visual and/or audible signal such as a flash of light or beep, respectively, when the animal escapes.

The pet unit receiver 38 receives the transmitting antenna signal when the pet approaches the warning zone boundary 18 and passes the signal to a pet unit processing unit 36. The pet unit processing unit 36 analyzes the received signal and appropriately activates a stimulus delivery circuit 42. The stimulus delivery circuit 42 applies the corrective stimulus to the pet.

The receiver 38 further receives the location inquiry signal from the base unit transmitter 26. Upon receipt of the location inquiry signal, the processing unit 36 communicates with the location inquiry response signal generator 44 which generates the location inquiry response signal broadcast by the transmitter 40.

The escape notification system 10 is of the present invention provides a pet owner with notice that a pet has escaped a defined area 16. In one embodiment, the escape notification system 10 is integrated into an electronic animal containment system 12. It will be understood by those skilled in the art that the escape notification system 10 may be provided independently of the existing electronic animal containment systems 12, whereby the escape notification system 10 is added without requiring replacement of an otherwise suitable electronic animal containment system 12. The latter embodiment of the escape notification system 10 is further adaptable to be used with a conventional fence or in an otherwise unbounded area.

While the present invention has been illustrated by description of several embodiments and while the illustrative embodiments have been described in detail, it is not the intention of the applicant to restrict or in any way limit the scope of the appended claims to such detail. Additional modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, what is claimed is:

1. An escape notification system for monitoring the presence of a selected pet within a defined area, said escape notification system being adapted to selectively communicate through a communication network, said escape notification system comprising:
   a base unit including:
      a controller in communication with the communication network;
      a transmitter in communication with said controller;
      a receiver in communication with said controller;
      a location inquiry signal generator in communication with said controller for generating a location inquiry signal upon receipt of a location alert signal, said transmitter adapted to broadcast said location inquiry signal;
   a transmitting antenna in communication with said base unit and broadcasting a containment signal; and
   a pet unit worn by said pet, said pet unit comprising:
      a processing unit;
      a receiver in communication with said processing unit and adapted to receive said containment signal and said location inquiry signal, said processing unit generating said location alert signal upon receipt of said containment signal, said processing unit generating a location inquiry response signal upon receipt of said location inquiry signal, said base unit receiver being adapted to receive said location inquiry response signal, said base unit controller being adapted to discriminate whether said location inquiry response signal has been received in response to said location inquiry signal and to activate the communication network in the event said location inquiry response signal has not been received in response to said location inquiry signal; and
      a transmitter in communication with said processing unit for transmitting said location alert signal.

2. The escape notification system of claim 1 wherein said location inquiry signal is periodically broadcast through a selected duration after said location alert signal is received, so long as each said location inquiry signal is followed by receipt of said location inquiry response signal by said base unit receiver.

3. The escape notification system of claim 1 wherein said location inquiry signal is periodically broadcast after no said location inquiry response signal is received and until broadcast of said location inquiry signal is followed by receipt of said location inquiry response signal by said base unit receiver, indicating the pet has returned to within said defined area.

4. The escape notification system of claim 1 wherein
   said pet unit further includes a global positioning system (GPS) receiver
   for monitoring a position of the pet after the pet has been determined to have escaped from said defined area.

5. The escape notification system of claim 4 wherein the position information associated with the position of the pet received by said global positioning system receiver is provided to said base unit.

6. The escape notification system of claim 1 further comprising an escape notification device in communication with the communication network, said escape notification device indicating the location of said pet unit with respect to said transmitter of said base unit to a user of said escape notification system.

7. The escape notification system of claim 6 wherein said escape notification device is located proximately with respect to said base unit.

8. The escape notification system of claim 6 wherein said escape notification device is located remotely with respect to said base unit.

9. An escape notification system for monitoring the presence of a selected pet within a defined area, said escape notification system being adapted to selectively communicate through a communication network, said escape notification system comprising:
   a base unit including:
      a controller in communication with the communication network;
      a transmitter in communication with said controller;
      a receiver in communication with said controller;
      a location inquiry signal generator in communication with said controller for generating a location inquiry signal, said transmitter adapted to broadcast said location inquiry signal;
   a transmitting antenna in communication with said base unit for broadcasting a containment signal; and
   a pet unit worn by said pet, said pet unit comprising:
      a processing unit;
      a receiver in communication with said processing unit and adapted to receive said containment signal and said location inquiry signal, said processing unit generating a location alert signal upon receipt of said containment signal, said processing unit generating a location inquiry response signal upon receipt of said location inquiry signal, said base unit receiver being adapted to receive said location inquiry response signal, said base unit controller being adapted to discriminate whether said location inquiry response signal has been received in response to said location inquiry signal and to activate the communication network in the event said location inquiry response signal has not been received in response to said location inquiry signal, said location inquiry signal being periodically broadcast through a selected duration after said location alert signal is received, so long as each said location inquiry signal is followed by receipt of said location inquiry response signal by said base unit receiver;

a transmitter in communication with said processing unit for transmitting said location alert signal; and a global positioning system (GPS) receiver for monitoring a position of the pet after the pet has been determined to have escaped from said defined area.

10. The escape notification system of claim 9 wherein said location inquiry signal is periodically broadcast after no said location inquiry response signal is received and until broadcast of said location inquiry signal is followed by receipt of said location inquiry response signal by said base unit receiver, indicating the pet has returned to within said defined area.

11. The escape notification system of claim 9 wherein the position information associated with the position of the pet received by said global positioning system receiver is provided to said base unit.

12. An escape notification system for monitoring the presence of a selected pet within a defined area and selectively sending notifications to designated recipients through a communication network when the pet is determined to have left the defined area, said escape notification system comprising:

a base unit comprising an antenna bounding a containment area, said base unit producing a containment signal transmitted by said antenna, said base unit responsive to a location alert signal and a location inquiry response signal, said base unit generating a location inquiry signal in response to receiving said location alert signal, said base unit sending a notification through the communication network when said location inquiry response signal is not received in response to said location inquiry signal; and a pet unit adapted to be carried by a pet, said pet unit responsive to said containment signal, said pet unit transmitting said location alert signal in response to receiving said containment signal, said pet unit transmitting said location inquiry response signal in response to receiving said location inquiry signal.

13. The escape notification system of claim 12 wherein said base unit continues to receive said location inquiry response signal in response to said location inquiry signal, said location inquiry signal being periodically transmitted for a selected period of time following receipt of said location alert signal.

14. The escape notification system of claim 12 wherein said base unit does not receive said location inquiry response signal in response to said location inquiry signal, said location inquiry signal being periodically transmitted until said base unit receives said location inquiry response signal thereby indicating the pet has returned to said containment area.

15. The escape notification system of claim 12 wherein said pet unit further comprises a global positioning system receiver for receiving location data after the pet has been determined to have escaped from said defined area.

* * * * *